Figure 1:
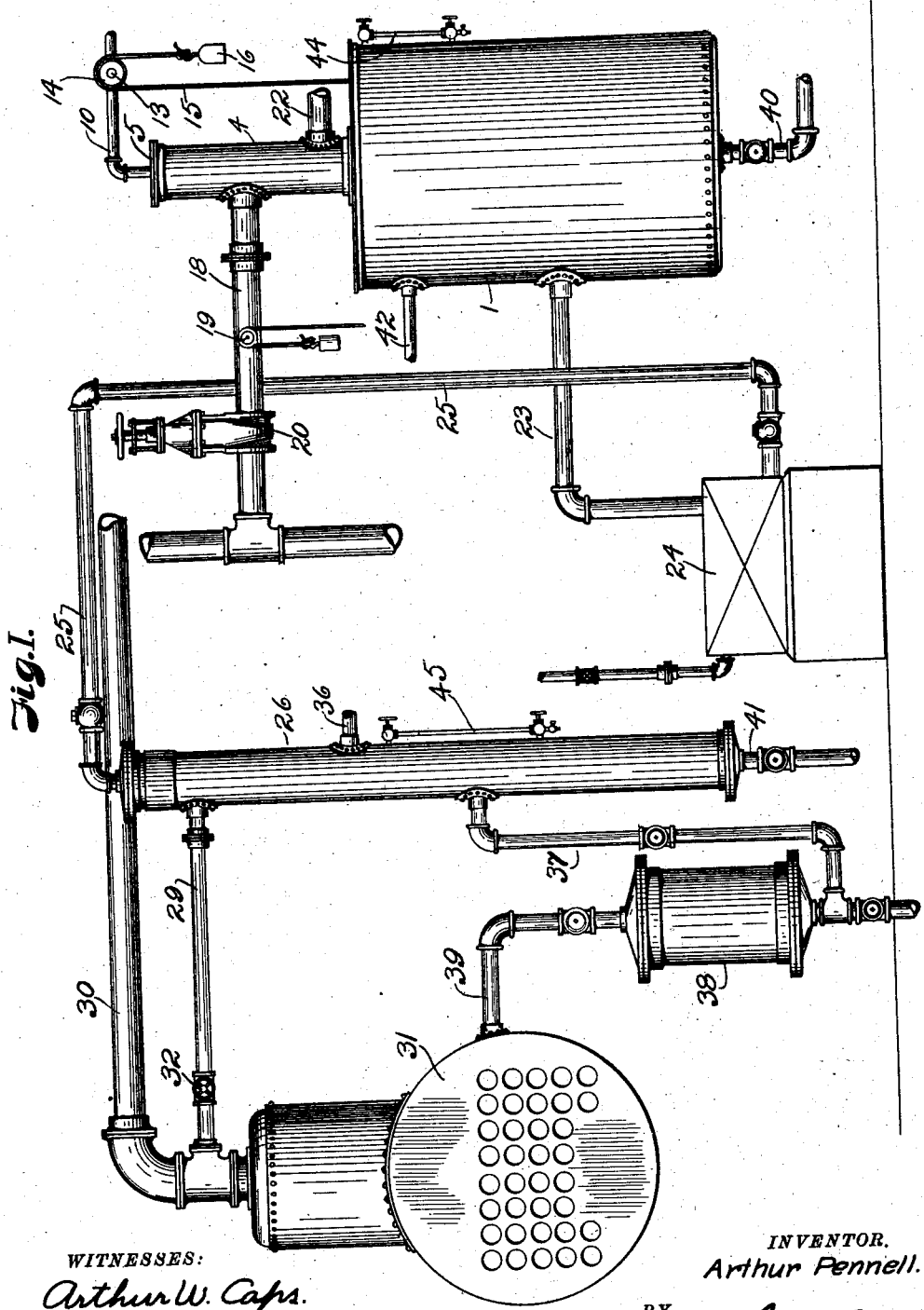

A. PENNELL.
APPARATUS FOR HEATING BOILER FEED WATER.
APPLICATION FILED JAN. 9, 1911.

WITNESSES:

INVENTOR.
Arthur Pennell.
BY
ATTORNEY.

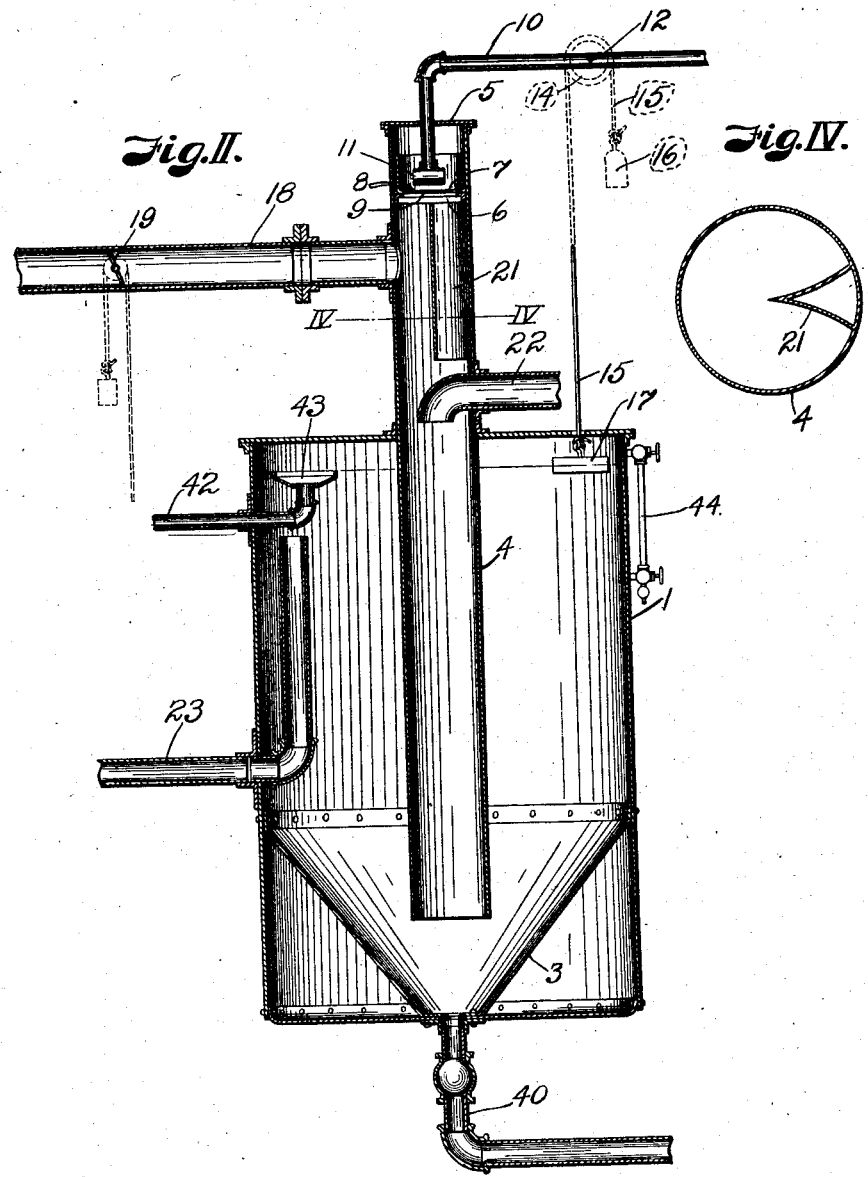

A. PENNELL.
APPARATUS FOR HEATING BOILER FEED WATER.
APPLICATION FILED JAN. 9, 1911.
1,011,483.
Patented Dec. 12, 1911.
3 SHEETS—SHEET 3.
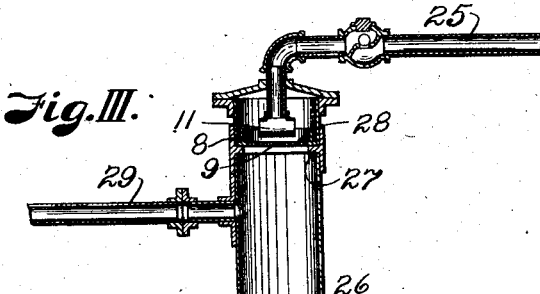
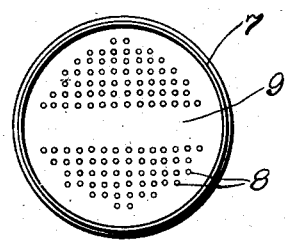
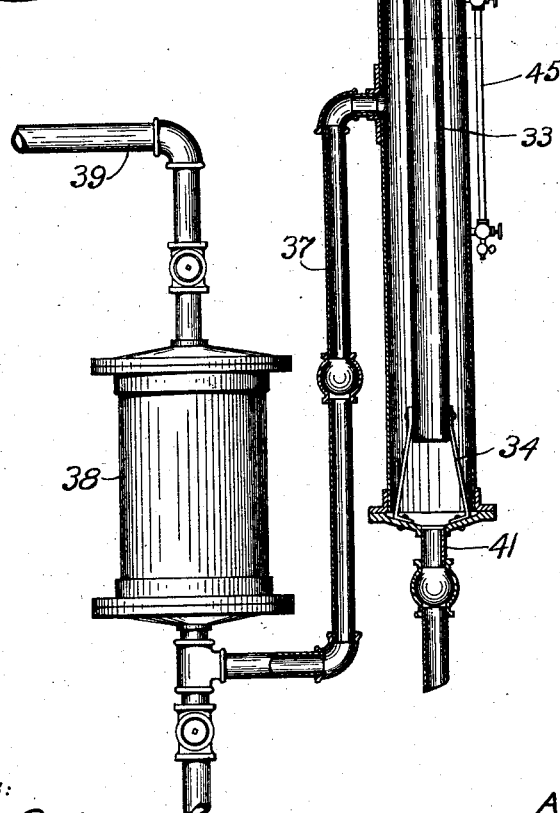
WITNESSES:
Arthur W. Caps.
Myrtle M. Jackson.
INVENTOR.
Arthur Pennell.
BY Arthur C. Brown
ATTORNEY.

UNITED STATES PATENT OFFICE.

ARTHUR PENNELL, OF KANSAS CITY, MISSOURI.

APPARATUS FOR HEATING BOILER FEED-WATER.

1,011,483. Specification of Letters Patent. Patented Dec. 12, 1911.

Application filed January 9, 1911. Serial No. 601,608.

*To all whom it may concern:*

Be it known that I, ARTHUR PENNELL, a citizen of the United States, residing at Kansas City, in the county of Jackson and State of Missouri, have invented certain new and useful Improvements in Apparatus for Heating Boiler Feed-Water; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an apparatus for heating boiler feed water and has for its object to provide an apparatus of that class wherein the feed water may be passed through steam, in the form of a shower, in order to facilitate the heating process.

It is a further object of my invention to provide the improved details of construction hereinafter described and pointed out in the claims, reference being had in the description to the accompanying drawings, in which:—

Figure I is an elevation of an apparatus constructed according to my invention. Fig. II is a vertical section of the exhaust steam shower cylinder. Fig. III is a similar view of the live steam shower cylinder. Fig. IV is a cross section of the exhaust shower cylinder on the line IV—IV, Fig. II. Fig. V is a plan view of the shower pan.

Referring more in detail to the parts:—

1 designates a settling tank which may be supported on a suitable platform and is provided with a false bottom 3 of inverted frusto-conical formation.

Extending through the top of the tank 1 is a cylinder 4, the lower end of which extends into the tank to a short distance above the tank bottom, and the upper end of which rises to a sufficient height above the tank to provide for the connections hereinafter mentioned and for a substantial shower fall.

Within the cylinder 4, near the top, is a ring 6, upon which is removably seated a plate or pan 7, having perforations 8, the perforations in said pan being set in from the periphery a sufficient distance to obviate contact of a shower, falling therefrom, with the sides of the cylinder, and to provide a space adjacent to the sides of the cylinder for the passage of steam between the sides of the cylinder and the shower, and there being a path 9 through the center of the pan having no perforations, so that water may be delivered into the cylinder in two showers, one at each side of the steam jet which will presently be described.

Opening through the cylinder cap 5 is a supply pipe 10, the inner end of which is turned downwardly to a short distance above the perforated pan, and is provided with a T 11, so that the feed is delivered horizontally over the top of the pan.

In the feed pipe 10 is a valve 12 having a projecting stem 13, on which is fixed a grooved wheel 14. Fixed to the wheel is a rope 15, to which is attached a weight 16, that is adapted to actuate the wheel and close the valve to shut off the flow through the feed pipe. Rope 15 extends through the top of the tank 1, where it is provided with a float 17, sufficiently heavy to overcome the weight 16 and retain the valve 12 open when unsupported, but which, when lifted by water in the tank, will allow the weight 16 to actuate and close the valve.

Opening into the cylinder 4, below the shower pan 7, is an exhaust steam pipe 18 having a damper valve 19 and gate valve 20 of ordinary construction. Fixed to the inside of the cylinder 4 is a spreader 21, which extends from below the shower pan to a point slightly above the tank 1, and is adapted for dividing the steam jet so it will pass between the segmental showers and warm the incoming water, and will engage the sides of the spreader and be turned back into the space between the showers and the side of the cylinder.

Opening from the cylinder 4, close to the top of the tank, is an outlet 22 for non-condensable gases.

Extending through the side of tank 1 is a pipe 23, the inner end of which is turned upwardly and extended to near the top of the tank terminating a sufficient distance below the water line to receive the boiler feed water after the same has had an opportunity to clarify by rising in the tank, but without taking in any grease or skimmings that may be floating on the surface.

Pipe 23 delivers into a pump 24, which latter is provided with a delivery pipe 25 which opens into the top of a live steam heating cylinder 26 in the same manner as the pipe 10 is connected with the exhaust steam cylinder 4. Cylinder 26 is also provided with a ring 27 which carries a shower pan 28 having perforations similar to those in the pan 7.

Opening into cylinder 26, below the shower pan, is a pipe 29 which is preferably a branch of the live steam pipe 30 leading from the boiler 31; this branch having a valve 32 for controlling the flow through the pipe, so that the shower jet may be regulated or shut off entirely.

In the lower portion of the cylinder 26 is a tube 33 which is set in from the sides of the cylinder and supported from the cylinder bottom by legs 34, so that water descending in the cylinder will be taken into the tube, through the funnel mouth 35 and delivered into the bottom of the tube, so that it may rise around the tube and clarify before the outlet mouth is reached.

Above the intake funnel 35 is an outlet pipe 36, through which the non-condensable gases taken into the cylinder with the live steam or through the feed tube, may find an outlet back to the main line steam pipe or to a pump (not shown).

Opening into the annulus in the cylinder 26, near the top of tube 33, is a feed pipe 37, which leads to a filter 38, through which the feed water is delivered by way of pipe 39 to the boiler 31.

In the bottom of tank 1 is a drain pipe 40, through which sediment collecting in the bottom of the tank may be withdrawn, and opening into the bottom of cylinder 26 is a similar drain pipe 41.

Opening into the upper portion of tank 1 is an overflow pipe 42, the inner end of which is provided with an upwardly facing skimmer 43 adapted for draining off lubricant oil which may pass into the heater in suspension in the exhaust steam.

44 and 45 designate gage glasses in the tank 1 and cylinder 26 respectively.

It is a well known fact that the internal conductivity of water for heat is low, and that the capacity of water for heat is high. Consequently, that water may absorb heat promptly and generously while passing through an atmosphere of steam, it must exhibit a very extended surface for the steam to condense upon. Such extended surface is obtained in the present apparatus by causing the water to fall in a shower from the perforated pan, the surface being still more extended when the water cylinders of the shower are broken up into slugs or spherical drops.

With the present apparatus in operation, when cold water enters the pan the ensuing shower down the cylinder effects considerable draft, causing the exhaust steam to enter and condense upon its surface; thus increasing the draft until sufficient steam enters to heat the water to a close approximation of its boiling point. This hot water falls through the bottom of the cylinder into the tank. During the first part of the operation, part of the non-condensable gases, entering with the hot water supply and exhaust-steam, pass into the tank chamber, but as the water in the tank rises, the end of the cylinder becomes water sealed and all of the non-condensable gases present in the shower, whether entrained in the exhaust-steam or expelled from the falling water by the rise in temperature, re-ascend to find an outlet to the atmosphere through the exits 22. When the water has risen to about the top of the tank it reaches the float 17 which controls the cold water supply and shuts off or checks the flow. By providing a tank of sufficient size to hold the maximum water requirement for a required period, the water is clarified, so that the flow to the boiler is clear and bright. Should the water passing through the boiler feed pipe carry a small amount of mineral matter in solution, it may be removed by the filter 38, which may be located in the boiler feed pipe between the tank and pump. With a pump of this construction, there is sufficient shower space above the non-condensable gas outlet to heat the water to its full temperature. By mounting the float so that the intake of cold water will hold the level of the water in the tank above the top of the boiler feed pipe, the feed through this pipe will be free from the oil and grease on the top of the water. When a quantity of the oil or grease has accumulated at the top of the tank, the float may be lifted manually and the level of the water in the tank raised so that the oil and grease may be drawn off through the skimmer.

While I prefer to use the heater as shown in the present drawings, it may be necessary or advisable, in some instances to use either the exhaust or live steam units alone. It is apparent that this can be done without departing from the spirit of my invention.

Having thus described my invention, what I claim as new therein and desire to secure by Letters-Patent is:—

1. The combination with an inclosing body, of shower producing means within the inclosing body, a steam pipe opening into the inclosing body below the shower producing means, and a constantly free outlet for non-condensable gases located below the steam pipe.

2. The combination with a suitable inclosing means, of a pan located within the inclosing means, said pan having an imperforate portion extending diametrically therethrough and having perforations at each side of the imperforate part; means for delivering water to the inclosing means above the pan, and a steam pipe opening into the inclosing means below the imperforate part of pan.

3. The combination with a cylinder, of a pan removably mounted within the cylinder and provided with perforations, the perforations in said pan being set in from the cylinder to provide a solid ring at the periphery of the pan, a steam pipe opening into the cylinder below said pan, and a spreader fixed on said cylinder opposite the intake of the steam pipe, substantially as set forth.

4. The combination with a cylinder, of a ring fixed to the inner surface of the cylinder, a pan seated on said ring and having an imperforate path extending diametrically thereacross, and perforations at each side of said path, a supply pipe adapted for delivering liquid over the top of the pan, a steam pipe opening into the cylinder below said pan, and a spreader mounted on the inside of said cylinder, opposite the intake of said steam pipe, said spreader being triangular with its apex directed toward the intake and its sides curved, substantially as set forth.

5. The combination with a tank, of a cylinder extending through the top of the tank and having an inner portion projecting to within a short distance of the tank bottom, a perforated pan located within the portion of the cylinder above the tank, a steam-pipe opening into the portion of the cylinder above the tank and below said pan, said cylinder being provided with an outlet for non-condensable gases, and means for delivering liquid to the interior of the cylinder above the pan, for the purpose set forth.

6. The combination with a tank, of a cylinder extending through the top of the tank and having an inner portion projecting to within a short distance of the tank bottom, a perforated pan located within the portion of the cylinder above the tank, a steam-pipe opening into the portion of the cylinder above the tank and below said pan, said cylinder being provided with an outlet for non-condensable gases, between the shower pan and the water line of the cylinder.

7. The combination with a tank, of a cylinder extending through the top of the tank and to within a short distance of the tank bottom, a perforated pan removably mounted within the upper part of the cylinder, a steam pipe opening into the cylinder, below the pan and above the tank top, a cover for the top of the cylinder, a supply pipe opening through the top of the cylinder and delivering over said pan, means for drawing off water from the upper portion of the tank, a drain pipe located in the bottom of the tank, a valve on the supply pipe and provided with a weight, and a float located in the upper part of the tank and adapted to lift the valve and weight, said cylinder being of the same cross sectional area throughout its length, substantially as set forth.

8. The combination with a tank, of a downtake extending through said tank, means for producing a shower within the downtake, a steam pipe delivering into the downtake, below the outlet of the shower producing means, and an outlet pipe for non-condensable gases extending through said downtake and having its inner end bent downwardly and provided with a horizontal mouth, substantially as set forth.

In testimony whereof I affix my signature in presence of two witnesses.

ARTHUR PENNELL.

Witnesses:
MYRTLE M. JACKSON,
ARTHUR C. BROWN.

---

Copies of this patent may be obtained for five cents each, by addressing the "Commissioner of Patents, Washington, D. C."